(12) United States Patent
Wang

(10) Patent No.: US 6,385,169 B1
(45) Date of Patent: May 7, 2002

(54) ALLOCATION OF BANDWIDTH IN A PACKET SWITCHED NETWORK AMONG SUBSCRIBERS OF A SERVICE PROVIDER

(75) Inventor: Zheng Wang, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/124,273

(22) Filed: Jul. 29, 1998

(51) Int. Cl.[7] ................................................ H04L 12/26
(52) U.S. Cl. ......................... 370/230; 370/412; 370/468
(58) Field of Search ................................. 370/229–236, 370/412, 465, 468

(56) References Cited

U.S. PATENT DOCUMENTS 5,995,487 A * 11/1999 Weaver et al. .......... 370/395.21
6,038,216 A * 3/2000 Packer ....................... 370/231
6,047,000 A * 4/2000 Tsang et al. ................. 370/412
6,148,337 A * 11/2000 Estberg et al. .............. 709/223

* cited by examiner

Primary Examiner—Melvin Marcelo
(74) Attorney, Agent, or Firm—Stuart H. Mayer

(57) ABSTRACT

A method is provided for allocating bandwidth to a subscriber in a service provider domain that is part of a packet switched network such as the Internet, for example. In accordance with the method, a number of shares of bandwidth are assigned to the subscriber based on an agreement between the subscriber and a service provider. A subscriber identifier and the number of shares assigned thereto are distributed to the routers in the domain of the service provider. The routers will in turn allocate bandwidth to packets they receive based on the number of shares assigned to the subscriber transmitting or receiving the packet. The subscriber may include one or more different user terminals that aggregate traffic onto a single datastream. The shares assigned to the user may denote absolute amount of bandwidth, or alternatively, may denote a relative bandwidth allocation.

14 Claims, 3 Drawing Sheets

ALLOCATION OF BANDWIDTH IN A PACKET SWITCHED NETWORK AMONG SUBSCRIBERS OF A SERVICE PROVIDER

FIELD OF THE INVENTION

The present invention relates generally to packet switched networks such as the Internet, and more particularly to a method for allocating bandwidth in a packet switched network to a service provider subscriber based on the cost paid by the subscriber to the service provider.

BACKGROUND OF THE INVENTION

The Internet is an example of a packet switched network in which individual packets are treated as independent datagrams on a best-effort model that are serviced on a FIFO basis. The best-effort model does not provide any form of traffic isolation among different users, however, and thus resources are shared only on the basis of how much bandwidth a user requests. Accordingly, adequate Internet functioning depends on the cooperation of hosts end systems such as TCP congestion control mechanisms. Reliance on the cooperation of the host end systems is increasingly becoming unrealistic. Inevitably, users attempt to exploit the weakness of the best-effort model to gain more resources. For example, Netscape's browser allows users to open multiple TCP connections. Moreover, with the best-effort model it is impractical to guarantee a quality of service level, either in terms of an absolute or relative amount of bandwidth, because all traffic is integrated into a single datastream or flow.

Quality of service (QoS) alternatives to the best effort model have been extensively studied. Many of the alternatives are based on the reservation of resources on an end-to-end basis prior to establishing communication. Examples of such alternatives include RSVP and Int-Serv, which are discussed, for example, in L. Zheng, S. Deering, S. Estrin, S. Shenker, D. Zappala, "A New Resource Reservation Protocol", IEEE Network, September 1993. While the architectures of the various proposals differ in details, the underlying models generally employ an application-oriented approach in which applications make resource reservations on an end-to-end and per session basis. This approach achieves QoS guarantees by performing the following steps. First, the particular application characterizes its traffic in probabilistic (e.g., equivalent bandwidth) or a deterministic (e.g., leaking bucket) profile and describes its requirements in a flow specification. Based on these requirements, one or more potentially satisfactory paths through the network are found. Next, a reservation/signaling protocol installs the reservation over the potential path on a hop-by-hop basis, assuming that the call admission control at each hop permits the reservation to be made.

However, end-to-end resource reservation methods encounter a number of problems when implemented over the Internet. For example, it is difficult for an application to accurately characterize traffic on an a priori basis. The traffic of a video source, for example, can be highly content-dependent. Additionally, end to end resource reservation methods do not work well for applications based on the World Wide Web, which are often characterized by sessions of very short duration. For applications with long lasting sessions, such as video conferences, the delays and overhead caused by the reservation process is minimal. However, for sessions of short duration there is a high overhead associated with establishing a reservation for each session and is thus much less useful.

Another problem with end-to-end resource reservation methods is that each reservation requires a separate service contract between the user and the network. Such on-demand per-session contracting has a high administrative overhead. Also, there is substantial complexity involved in the settling of accounts among different Internet service providers. When a path traverses multiple ISPs, an end-to-end reservation requires an agreement among all the major ISPs involved. Any given ISP that does not participate in such an agreement may prevent the reservation from being made. Finally, end-to-end resource reservation methods do not scale well as the number of reservations increases. Since the number of reservations that is required increases linearly with the number of active application sessions traversing a link, the signaling process involved in establishing the reservation can become a bottleneck.

Other approaches to Internet traffic generally fall into two categories: the profile-based tagging model and the delay priority model. In the profile-based tagging model, each user and its respective ISP agree on a profile of traffic to be given routed in an expedited manner. When the traffic entering the domain of the ISP exceed a specified profile, the excess packets are admitted but tagged. If congestion arises within the ISP's domain, the routers will begin to disregard packets, starting with the tagged packets. That is, profile-based tagging essentially creates two categories of traffic: tagged and untagged. The tagged traffic is treated in a FIFO fashion. A misbehaving source may still gain more bandwidth simply by injecting excessive traffic. This problem can be aggravated when the fixed profiles are significantly above (or below) the level appropriate for the congested links. In such a case the majority of the packets are not tagged (or are tagged). Thus, tagging provides little information to enforce differentiation and the network behavior essentially defaults to something similar to a simple FIFO best effort model.

The delay priority model represents an extreme form of resource allocation in which the lower priority classes suffer all the consequences of congestion. Unless the priority traffic only accounts for a very small percentage of the link capacity, lower priority traffic may experience significant deterioration under congestion, and may in fact fail to receive any bandwidth whatsoever. In fact, TCP has the tendency to utilize as much bandwidth as it can. Because the congestion is invisible to the higher priority traffic, the network no longer provides any indication of congestion to the higher priority traffic. Thus, TCP windows in the higher priority classes may expand until there is no bandwidth available to the lower priority traffic.

The end-to-end model and the best effort model represent two extremes along a spectrum of the previously mentioned approaches. That is, the best effort model provides no traffic isolation while the end-to-end model provides isolation at the finest level of granularity, that of an individual connection. Presumably, an appropriate solution lies somewhere between the two extremes.

Accordingly, it would be desirable to allocate network resources by selecting an appropriate level of granularity for isolating traffic that better satisfies the needs of both the users and the service providers and which is also scalable as the Internet continues to grow.

SUMMARY OF THE INVENTION

The present invention provides a method for allocating bandwidth to a subscriber in a service provider domain that is part of a packet switched network such as the Internet, for example. In accordance with the method, a number of shares of bandwidth are assigned to the subscriber based on a contractual agreement between the subscriber and the service provider. A subscriber identifier and the number of shares assigned thereto are distributed to the routers in the domain of the service provider. The routers will in turn allocate bandwidth to packets they receive based on the number of shares assigned to the subscriber transmitting or receiving the packet. The subscriber may include one or more different user terminals that aggregate traffic onto a single datastream. The shares assigned to the user may denote an absolute amount of bandwidth, or alternatively, may denote a relative bandwidth allocation.

In accordance with another aspect of the invention, a method is provided for routing packets of traffic in a packet switched network, which are received by a service provider. The service provider first determines if a received packet has a source or destination address belonging to a subscriber of the service provider and, if so, the service provider determines a pre-assigned share of available bandwidth assigned to the subscriber. The packet is placed in a queue dedicated to the subscriber and the value of the pre-assigned share is allocated to the queue. Packets are selected from the queue based on the pre-assigned share of available bandwidth. Finally, the selected packets are transmitted to another router in the network.

The inventive methods advantageously provide differentiated services with a level of granularity that meets users' and ISP's needs since the basic unit defining granularity is the user. All traffic originating from or destined for a given user is aggregated into a single datastream. When there is contention of resources, limited resources are allocated on the basis of the contracts between the ISP and its users.

DETAILED DESCRIPTION

Figure 1:
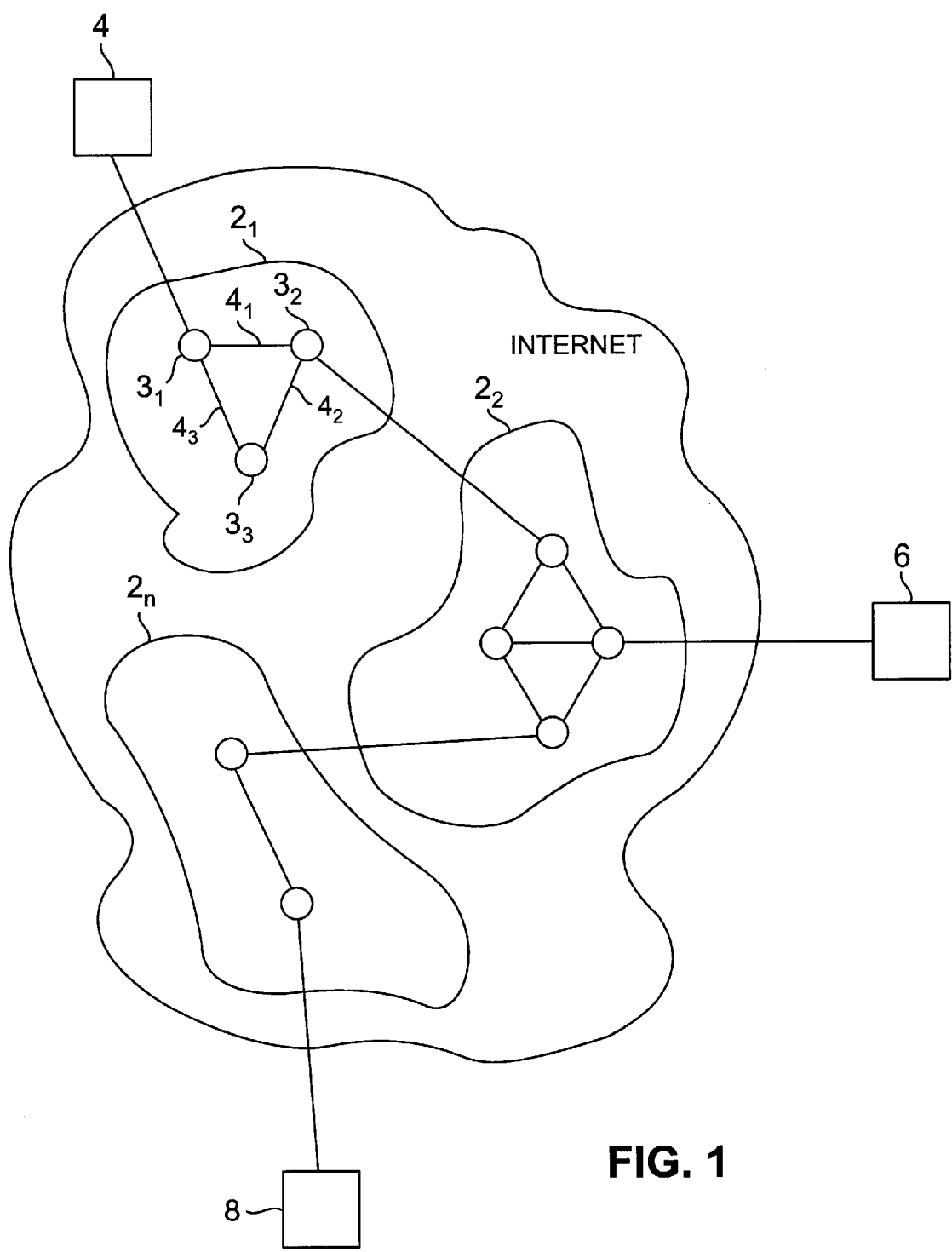
FIG. 1 shows a simplified block diagram of a packet switched network such as the Internet.

FIG. 1 shows a simplified block diagram of a packet switched network such as the Internet. The network includes a plurality of service providers $2_1, 2_2, \ldots 2_n$ that each control their respective network domains. For example, the domain of service provider $2_1$ includes routers $3_1, 3_2$ and $3_3$ interconnected by links $4_1, 4_2,$ and $4_3$. Users communicate over the network by subscribing to a particular service provider. For example, in FIG. 1 users 4 and 6 are subscribers of service provider $2_1$ and $2_2$, respectively, and user 8 is a subscriber of service provider $2_n$. As employed herein a user is defined as the entity to which a network resource (i.e., bandwidth ) is allocated. A user thus may be an individual terminal or an aggregate of terminals, which has a single account with a service provider. A share denotes the amount of bandwidth that is allocated to a given user.

In accordance with the present invention, when each user subscribes to an ISP for Internet services the user is allocated a given share determined by the particulars of the subscription plan and the fee paid to the service provider. The ISP then guarantees that the user will have a specified minimum amount of bandwidth available on all or a selected subset of links within the ISP's domain. If the user requires bandwidth in excess of its specified minimum amount, the user shares bandwidth with other users in proportion to its allocated share.

For example, suppose that users A and B request a minimum bandwidth of 2 Mbps and 10 Mbps, respectively, and the ISP in turn allocates 1000 and 5000 shares, respectively. The present invention guarantees that users A and B each have their requested minimum number of shares. If any bandwidth remains available over the minimum, it is allocated to users A and B in the ratio of 1:5.

The inventive method advantageously provides differentiated services with a level of granularity that meets users' and ISP's needs. Specifically, the basic unit defining granularity is the user. All traffic originating from or destined for a given user is aggregated into a single flow. When there is contention of resources, limited resources are allocated on the basis of the contracts between the ISP and its users.

By defining the granularity within an ISP in terms of the user, a good balance is reached between traffic aggregation and isolation. Traffic isolation is achieved between different users without the need to recognize the individual communication sessions of any given user. As a result, since the traffic belonging to a given user is guaranteed by the ISP in accordance with the user-ISP contract, resource allocation is achieved on a long term basis when a subscription is created. Within its share of the bandwidth, the user manages its own communication sessions and decides how its resources should be utilized.

By isolating traffic among different users, a misbehaving user cannot impede the communication sessions of other users. If the misbehaving user ignores evidence of congestion and continues to transmit traffic at high rates, it can only hurt itself. Thus, users are given a strong incentive to implement intelligent control congestion mechanisms to efficiently use their allocated shares of the bandwidth.

As traffic passes from the domain of one ISP to the domain of another ISP, the definition of a user changes. As a result, the level of aggregation changes accordingly. For example, dial-up customers are typically users of a retail ISP and the retail ISP in turn is a user of a backbone ISP. Within the domain of the retail ISP traffic from (or to) a dial-up user is aggregated so that only the retail ISP is visible to the backbone ISP. Such a variable level of aggregation ensures a great deal of scalability. In general, when packets are close to the source ISP, the sender's allocation of shares has the most influence and as packets move closer to the destination, the receiver's allocation of shares becomes most influential.

By incorporating the concept of a user into its traffic isolation procedures, ISPs are provided with a very flexible tool for selecting the level of traffic aggregation they desire. While the maximum granularity that can be achieved is at the level of an individual customer, the ISPs can achieve varying levels of aggregation by creating different user classes. For example, an ISP may create three user classes: premium users, basic users, and best-effort users.

The bandwidth of a single link can be allocated to a plurality of users in terms of the actual bandwidth or relative bandwidth. For example, suppose that a given ISP has four users A, B, C, and D sharing an access link of 30 Mbps. The allocation agreed to between the ISP and the users is 4, 6, 8 and 12 Mbps, respectively, which is clearly defined in terms of the actual bandwidth. Alternatively, however, the allocation can expressed by the ratio 2:3:4:6, which is the relative bandwidth allocation. When the bandwidth is in fact allocated in proportion to the relative bandwidth, the two representations lead to the same amount of bandwidth being allocated.

The allocation of relative bandwidth has a number of advantages over the allocation of actual bandwidth. First, it can guarantee the same minimum bandwidth allocation as the actual bandwidth allocation method. In addition, however, relative bandwidth allocation allows any additional bandwidth above the minimum allocation value to be easily shared. For example, suppose that users A and B in the previous example are not using their allocated bandwidth during a given time period. During this time period users C and D may share the unused bandwidth in proportion to their relative share. Accordingly, the final bandwidth allocation to users C and D would be 12 Mbps and 18 Mbps, respectively.

Bandwidth allocation is most important for bottleneck links, which are those links on which demand exceeds supply. That is, a bottleneck link is a point of congestion in the network. The rate at which a user can send or receive traffic depends on the bandwidth of the bottleneck link and the number of users sharing that link. In some cases there may be multiple bottleneck links with different bandwidth provisions. A datastream may experience congestion on one or more bottleneck links. The ISP must ensure that bandwidth allocation is provided at least for the bottleneck links. For example, suppose in the previously mentioned example the ISP of users A, B, C, and D has another link available, which has 600 Mbps bandwidth. The four users, who have a relative bandwidth allocation of 2:3:4:6, will have their minimum guaranteed bandwidth automatically scaled up by 80, 120, 160, and 240 Mbps, respectively.

Figure 2:
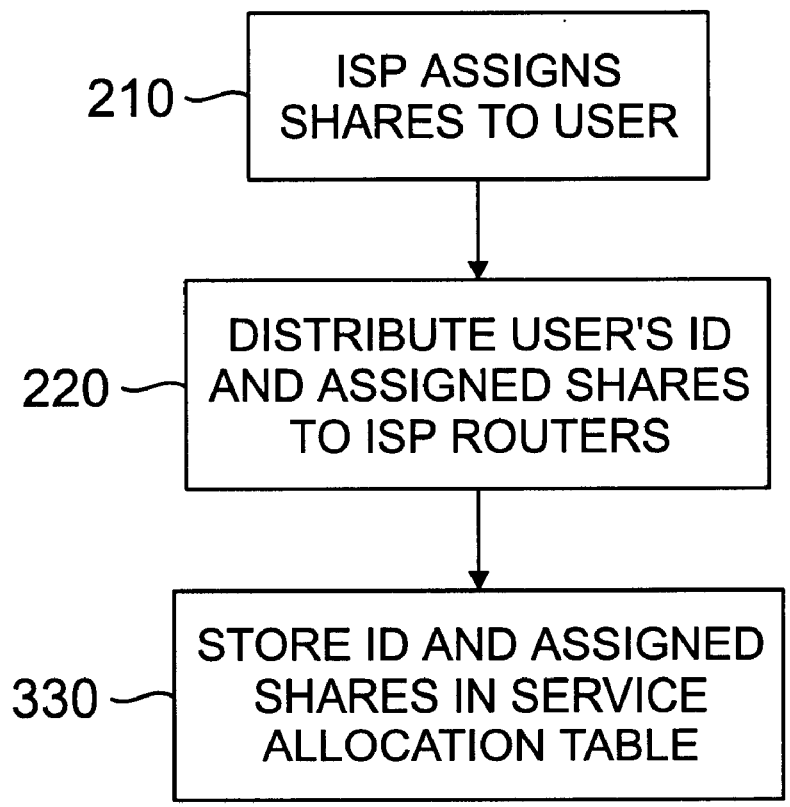
FIG. 2 shows a flowchart of the steps performed by an Internet service provider at the time a user subscribes to its service.

FIG. 2 shows a flowchart of the steps performed by the ISP at the time a user subscribes to its service. In step 210, the ISP assigns a certain number of shares to the user based on the price paid or package selected by the user. In step 220, the ISP distributes the user's identification number and the number of shares the user has been allocated to the IP routers in the ISP's network. It should be noted that the number of allocated shares may be applicable to all or only select routers. Finally, in step 330, the routers store the information in a service allocation table.

Figure 3:
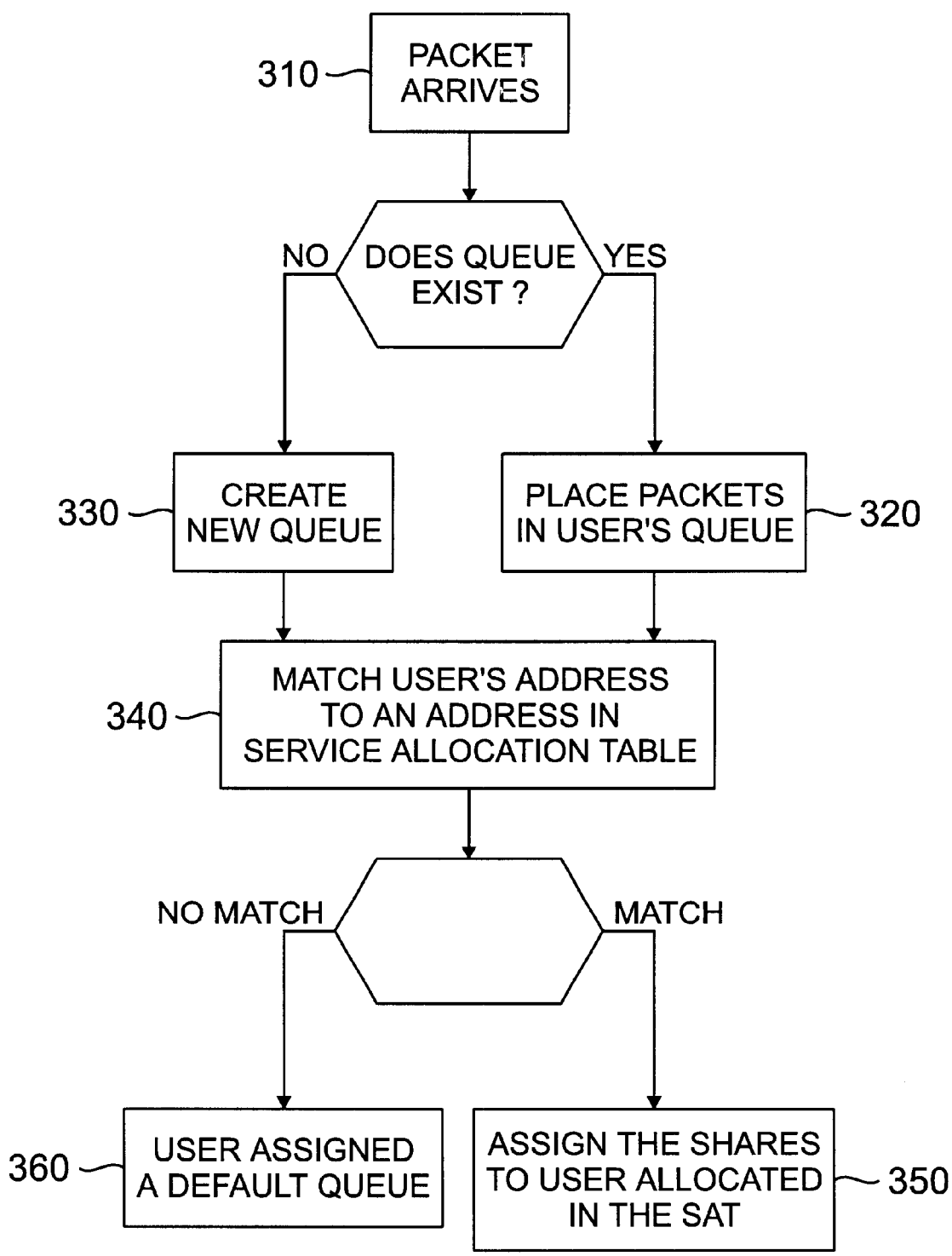
FIG. 3 shows a flowchart of the steps performed by a router in the ISP network upon the arrival of traffic.

FIG. 3 shows a flowchart of the steps performed by a router in the ISP network upon the arrival of traffic. In step 310, a packet arrives at the router interface. The router determines whether it has an active queue for this particular user. If there is such a queue, the packet is placed on the user's queue (step 320). If there is no such queue, a new queue is created (step 330). In either case the router executes a lookup routine on the service allocation table to determine if the user's address matches one of the source or destination addresses located in the table (step 340). If either the source or destination address is found in the table, the user's queue is allocated the number of shares specified for that user address. If both the source and destination addresses are found in the table, the user is assigned the number of shares corresponding to the address having the fewer number of shares (step 350). If neither the source or destination address is found in the table, the packet is placed in a default queue (step 360). The bandwidth allocated to a user is proportional to its number of shares. The amount of bandwidth provided to a datastream from a particular user depends on the number of competing datastreams from other users, but in any case the allocation will be fair in the sense that all things being equal, a user cannot get more bandwidth than an amount that is proportional to its number of shares. The router can implement such proportional fair sharing by selecting packets from the queue in accordance with a scheduling algorithm such as the algorithm referred to as Weighted Fair Queueing, which is disclosed in A. K. Parekn et al., Proc of IEEE INFOCOM '92, May, 1992.

What is claimed is:

1. A method for allocating bandwidth to a subscriber in a service provider domain that is part of a packet switched network, said method comprising the steps of:

assigning a number of shares of bandwidth to the subscriber based on an agreement between the subscriber and a service provider;

distributing an identification of the subscriber and said number of shares assigned thereto to routers in the domain of the service provider.

2. The method of claim 1 wherein said subscriber comprises a plurality of different user terminals that aggregate data onto a single datastream.

3. The method of claim 1 wherein said shares denote a relative bandwidth allocation.

4. The method of claim 1 wherein said shares denote an absolute amount of bandwidth.

5. The method of claim 1 further comprising the step of storing said subscriber identification and said number of assigned shares in a service allocation table.

6. The method of claim 1 wherein the step of assigning bandwidth comprises the step of assigning bandwidth only for predefined bottleneck links.

7. The method of claim 1 wherein said packet network is the Internet and said service provider is an Internet service provider.

8. A method for routing packets of traffic in a packet switched network received by a service provider:

determining if the packet has a source or destination address belonging to a subscriber of the service provider and, if so, determining a pre-assigned share of available bandwidth assigned to the subscriber;

placing the packet in a queue dedicated to the subscriber;

allocating said pre-assigned share to said queue;

selecting packets from the queue based on the pre-assigned share of available bandwidth;

transmitting the selected packets to another router in the network.

9. The method of claim 8 wherein said subscriber comprises a plurality of different user terminals that aggregate data onto a single datastream.

10. The method of claim 8 wherein said pre-assigned share denotes a relative bandwidth allocation.

11. The method of claim 8 wherein said pre-assigned share denotes an absolute amount of bandwidth.

12. The method of claim 8 wherein the determining step comprising the step of retrieving subscriber information from a service allocation table.

13. The method of claim 8 wherein the step of allocating the pre-assigned shares is only performed for predefined bottleneck links.

14. The method of claim 8 wherein said packet network is the Internet and said service provider is an Internet service provider.

* * * * *